(12) United States Patent
Hsieh et al.

(10) Patent No.: US 10,625,446 B2
(45) Date of Patent: Apr. 21, 2020

(54) HIGH-TEMPERATURE HOT-PRESSING MOLDING MACHINE

(71) Applicant: National Formosa University, Yun-Lin County (TW)

(72) Inventors: Shu-Huei Hsieh, Yun-Lin County (TW); Yi-Ren Tzeng, Yun-Lin County (TW); Sheng-Hsiang Chiang, Yun-Lin County (TW); Wen-Chen Liao, Yun-Lin County (TW)

(73) Assignee: National Formosa University, Yun-Lin County (TW)

( * ) Notice: Subject to any disclaimer, the term of this patent is extended or adjusted under 35 U.S.C. 154(b) by 249 days.

(21) Appl. No.: 15/425,254

(22) Filed: Feb. 6, 2017

(65) Prior Publication Data
US 2018/0126608 A1    May 10, 2018

(30) Foreign Application Priority Data
Nov. 9, 2016    (TW) ............................. 105136379 A

(51) Int. Cl.
| | |
|---|---|
| B29C 43/52 | (2006.01) |
| B29C 33/02 | (2006.01) |
| B21D 22/02 | (2006.01) |
| B21D 37/16 | (2006.01) |
| B29C 43/56 | (2006.01) |
| B29K 103/04 | (2006.01) |
| B29C 43/02 | (2006.01) |

(52) U.S. Cl.
CPC ............ *B29C 43/52* (2013.01); *B21D 22/022* (2013.01); *B21D 37/16* (2013.01); *B29C 33/02* (2013.01); *B29C 43/56* (2013.01); *B29C 43/02* (2013.01); *B29C 2033/023* (2013.01); *B29C 2043/563* (2013.01); *B29K 2103/04* (2013.01)

(58) Field of Classification Search
CPC ........ B29C 43/52; B29C 33/02; B29C 43/56; B29C 2033/023; B29C 2043/563; B29C 43/02; B21D 22/022; B21D 37/16; B29K 2103/04
See application file for complete search history.

(56) References Cited

U.S. PATENT DOCUMENTS

| | | | | |
|---|---|---|---|---|
| 3,383,737 A | * | 5/1968 | Greger | ..................... B01J 6/001 425/406 |
| 3,628,779 A | * | 12/1971 | Lundstrom | ............... B22F 3/15 266/251 |
| 3,743,132 A | * | 7/1973 | Larker | ..................... B22F 3/15 220/215 |

(Continued)

*Primary Examiner* — Leith S Shafi

(57) ABSTRACT

A high-temperature hot-pressing molding machine includes a mold unit, a heating, unit disposed to heat the mold unit, a heat insulating unit including a surrounding insulating member to enclose the mold unit and two insulating layers disposed on two opposite sides of the mold unit to obstruct heat radiation and conduction from the mold unit, a heat dissipating unit disposed on the insulating layers, a cooling unit disposed on the heat dissipating unit, and a vacuum unit disposed to form a vacuum space. Under a vacuum environment, with the heat insulating unit defining a heat zone containing the mold unit, other component parts adjacent to the heat zone can be prevented from damage in a high temperature operation.

4 Claims, 8 Drawing Sheets

(56) References Cited

U.S. PATENT DOCUMENTS

| | | | | |
|---|---|---|---|---|
| 4,033,400 A | * | 7/1977 | Gurwell | B22F 3/26 |
| | | | | 164/98 |
| 4,874,564 A | * | 10/1989 | Sudani | B28B 3/025 |
| | | | | 264/29.7 |
| 5,297,480 A | * | 3/1994 | Miyashita | B29C 33/02 |
| | | | | 100/320 |
| 5,678,166 A | * | 10/1997 | Piehler | B22F 3/093 |
| | | | | 419/38 |
| 7,195,476 B2 | * | 3/2007 | Ito | B29C 43/36 |
| | | | | 100/90 |
| 2010/0269558 A1 | * | 10/2010 | Morales | B21D 22/00 |
| | | | | 72/42 |
| 2014/0367251 A1 | * | 12/2014 | Adachi | B30B 11/027 |
| | | | | 204/298.12 |

* cited by examiner

HIGH-TEMPERATURE HOT-PRESSING MOLDING MACHINE

CROSS-REFERENCE TO RELATED APPLICATION

This application claims priority of Taiwanese Patent Application No. 105136379, filed on Nov. 9, 2016.

FIELD

The disclosure relates to a high-temperature hot-pressing molding machine, and more particularly to a high-temperature hot-pressing molding machine operable in a vacuum environment.

BACKGROUND

Referring to FIG. 1, a conventional hot-pressing molding machine 1 as disclosed in Taiwanese Patent No. M360124 includes a lower die 11, an upper die 12 movable relative to the lower die 11, and an enclosure 13 disposed to enclose the lower and upper dies 11, 12 for defining a vacuum chamber. An object or material (not shown) is heated and pressed in a mold cavity defined by facing surfaces of the lower and upper dies 11, 12 when the lower and upper dies 11, 12 are closed under a vacuum environment, so that even pressure and heat can be provided to prevent formation of bubbles in products.

Although such vacuum chamber facilitates the structural transformation or chemical reaction of an object or material under heating and pressing, heat radiation and heat conduction in a vacuum environment may cause damage to the upper die 12 or the lower die 11, or other component parts adjacent to the lower and upper dies 11, 12 due to high temperature. Hence, the maximum heat-resistance temperature of the hot-pressing molding machine is generally about 400° C. such that the hot-pressing molding machine cannot be employed to perform a heating and pressurizing process for a long period of time, such as a pyrolytic reaction of a non-graphitizable carbon material where a pyrolysis temperature of above 500° C. is required.

SUMMARY

Therefore, an object of the disclosure is to provide a high-temperature hot-pressing molding machine that can alleviate at least one of the drawbacks of the prior art.

According to the disclosure, the high-temperature hot-pressing molding machine includes a mold unit, a heating unit, a heat insulating unit, a heat dissipating unit, a cooling unit and a vacuum unit. The mold unit includes first and second dies which are movable relative to each other along an axis, and which respectively have first and second forming surfaces facing each other along the axis and defining a mold cavity therebetween when the first and second forming surfaces are moved closer to each other to place the mold unit in a closed position, and first and second distal die surfaces opposite to the first and second forming surfaces, respectively. The heating unit is disposed within one of the first and second dies to heat the mold unit when the mold unit is in the closed position. The heat insulating unit includes surrounding insulating member which surrounds about the axis to enclose the mold unit when the mold unit is in the closed position, and first and second insulating layers which are disposed normal to the axis to be respectively attached to the first and second distal die surfaces of the first and second dies so as to obstruct conduction of heat generated from the mold unit and which respectively have first and second distal insulating surfaces remote from the first and second dies. The heat dissipating unit includes first and second heat dissipating layers which are disposed normal to the axis to be respectively attached to the first and second distal insulating surfaces of the first and second insulating layers and which respectively have first and second distal dissipating surfaces remote from the first and second insulating layers. The cooling unit includes first and second cooling layers which are disposed normal to the axis to be respectively attached to the first and second distal dissipating surfaces so as to remove heat therefrom along a direction of the axis. The vacuum unit is disposed to be moved so as to enclose the mold unit, the heating unit, the heat insulating unit and the heat dissipating unit, and forms therein a vacuum space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
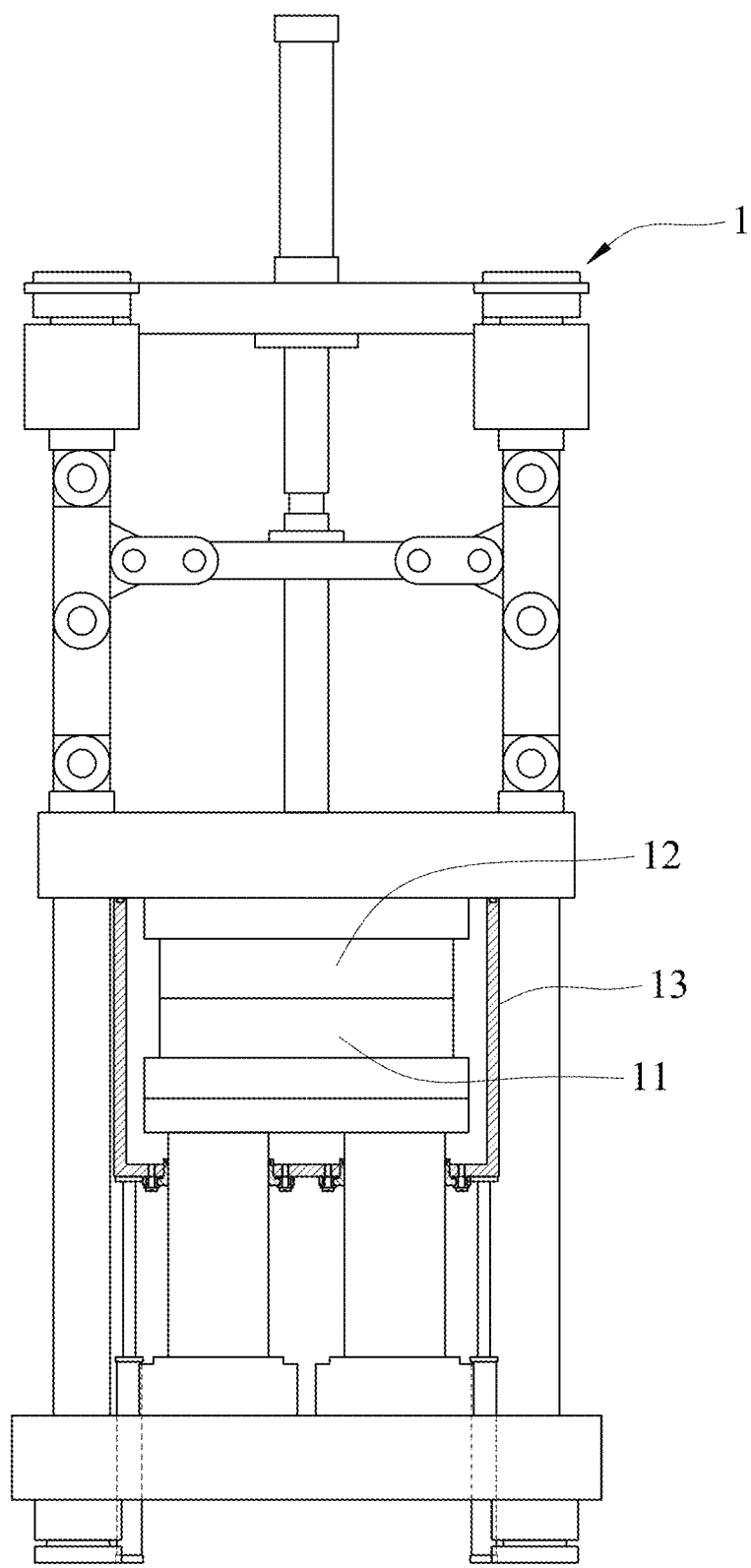
FIG. 1 is a schematic view of a conventional hot-pressing molding machine.
Figure 2:
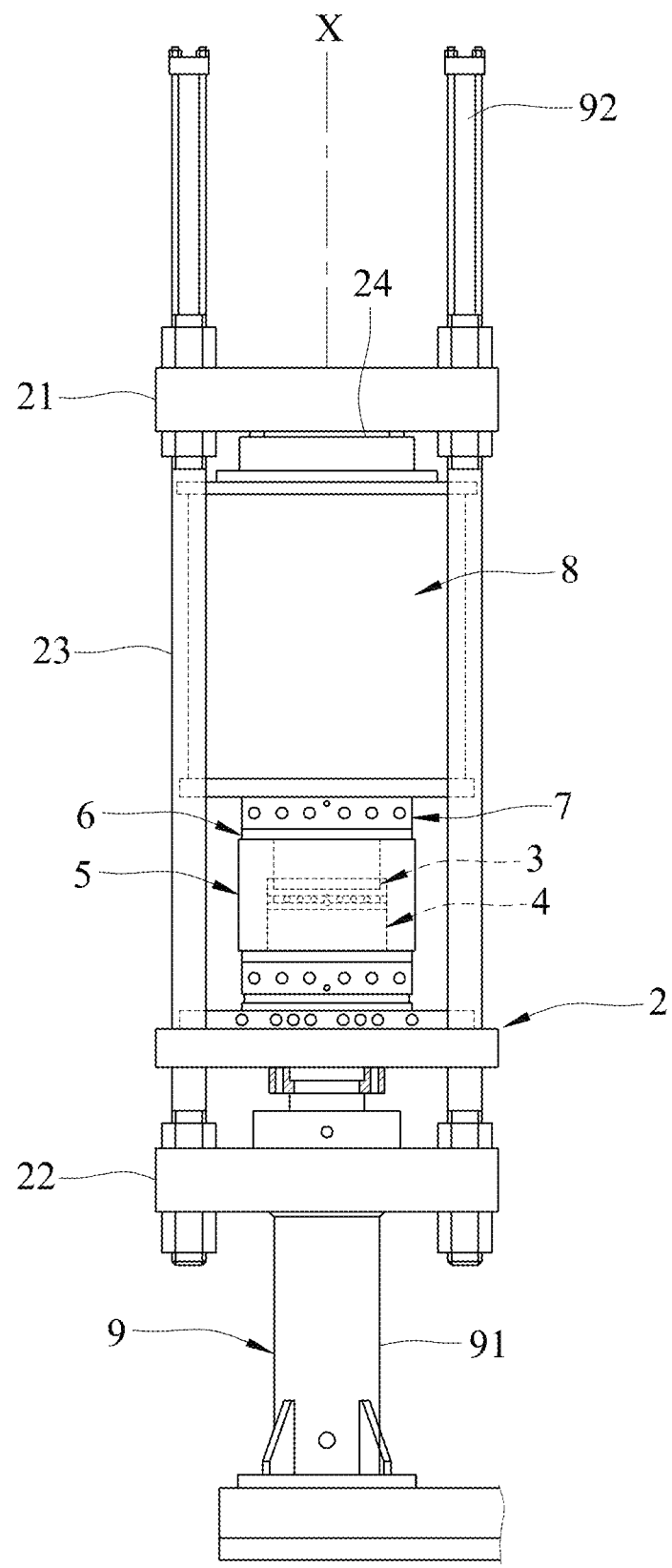
FIG. 2 is a schematic front view of an embodiment of a high-temperature hot-pressing molding machine according to the disclosure.
Figure 3:
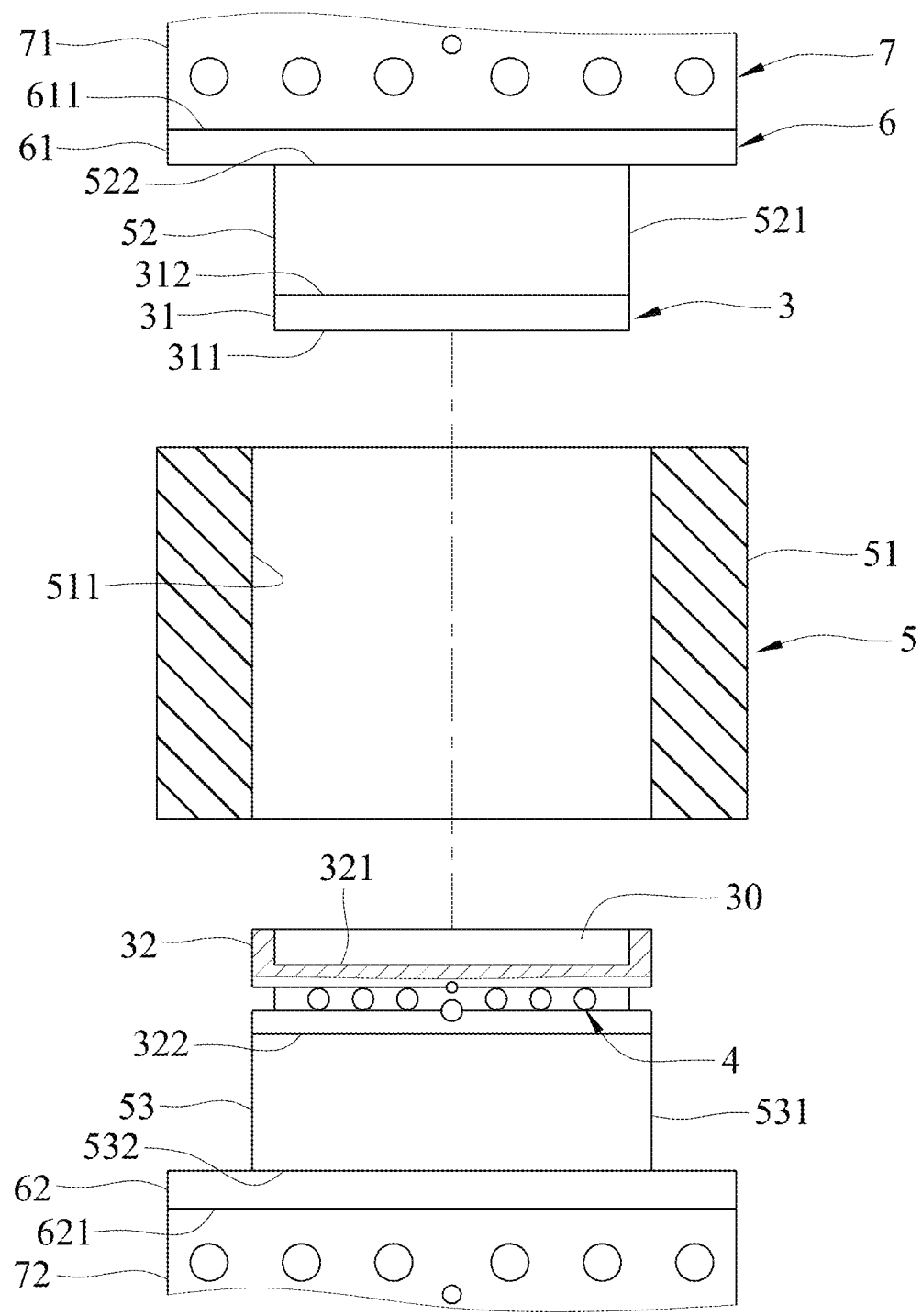
FIG. 3 is a fragmentary, partly-sectioned exploded view of the embodiment.

Referring to FIGS. 2 and 3, an embodiment of a high-temperature hot-pressing molding machine according to this disclosure includes a machine base 2, a mold unit 3, a heating unit 4, a heat insulating unit 5, a heat dissipating unit 6, a cooling unit 7, a vacuum unit 8 and a driving unit 9.

The machine base 2 includes an upper seat 21 and a lower seat 22 spaced apart from each other along an axis (X), a four-leg support 23 for supporting the upper and lower seats 21, 22 thereon, and a central shaft 24 extending along the axis (X) from the upper seat 21.

The mold unit 3 includes first and second dies 31, 32 which are movable relative to each other along the axis (X), and which respectively have first and second forming surfaces 311, 321 facing each other along the axis (X) and defining a mold cavity 30 therebetween when the first and second forming surfaces 311, 321 are moved closer to each other to place the mold unit 3 in a closed position (see FIG. 5), and first and second distal die surfaces 312, 322 opposite to the first and second forming surfaces 311, 321, respectively. In this embodiment, the first and second dies 31, 32 are made from a zirconia or stainless steel material.

The heating unit 4 is disposed within one of the first and second dies 31, 32 (e.g. within the second die 32) to heat the mold unit 3 when the mold unit 3 is in the closed position.

The heat insulating unit 5 includes a surrounding insulating member 51 which surrounds about the axis (X) to enclose the mold unit 3 when the mold unit 3 is in the closed position, and first and second insulating layers 52, 53 which are disposed normal to the axis (X) to be respectively attached to the first and second distal die surfaces 312, 322 of the first and second dies 31, 32. In this embodiment, the surrounding insulating member 51 is made from a fire retardant padding material. The first and second insulating layers 52, 53 are inserted into and disposed inwardly of the surrounding insulating member 51 in a direction of the axis (X), and are made from a zirconia or mica material. An inner surrounding surface 511 of the surrounding insulating member 51 is spaced apart from an outer peripheral surface 521, 531 of each of the first and second insulating layers 52, 53 by a gap that is less than 1 centimeter. The first and second insulating layers 52, 53 respectively have first and second distal insulating surfaces 522, 532 remote from the first and second dies 31, 32.

The heat dissipating unit 6 includes first and second heat dissipating layers 61, 62 which are disposed normal to the axis (X) to be respectively attached to the first and second distal insulating surfaces 522, 532 of the first and second insulating layers 52, 53, and which respectively have first and second distal dissipating surfaces 611, 621 remote from the first and second insulating layers 52, 53. Specifically, the first and second heat dissipating layers 61, 62 are configured to respectively carry the first and second dies 31, 32 and to permit each of the first and second insulating layers 52, 53 to be sandwiched between a respective one of the first and second heat dissipating layers 61, 62 and a respective one of the first and second dies 31, 32. Additionally, the first heat dissipating layer 61 is connected with an end of the central shaft 24 of the machine base 2.

The cooling unit 7 includes first and second cooling layers 71, 72 which are disposed normal to the axis (X) to be respectively attached to the first and second distal dissipating surfaces 611, 621 of the first and second heat dissipating layers 61, 62 so as to remove heat therefrom along the direction of the axis (X). In this embodiment, each of the first and second cooling layers 71, 72 is in the form of a cooling pipe assembly.

The vacuum unit 8 is disposed to be moved so as to enclose the mold unit 3, the heating unit 4, the heat insulating unit 5, the heat dissipating unit 6 and the cooling unit 7, and forms therein a vacuum space 80.

The driving unit 9 includes a mold driving device 91 and at least one vacuum driving device 92. The mold driving device 91 is disposed to actuate the second cooling layer 72, the second heat dissipating layer 62 and the second die 32 to move between a demolded and opened position (see FIG. 4) where the second die 32 is remote from the first die 31, and a molded and closed position (i.e. the closed position of the mold unit 3; see FIG. 5) where the second die 32 is engaged with the first die 31. The vacuum driving device 92 is disposed to actuate movement of the vacuum unit 8 along the central shaft 24 between a normal position (see FIG. 2) where the vacuum unit 8 is remote from the mold unit 3, and a vacuum position (see FIGS. 5 and 6) where the vacuum unit 8 encloses the mold unit 3, the heating unit 4, the heat insulating unit 5, the heat dissipating unit 6 and the cooling unit 7 to form therein the vacuum space 80.

Figure 4:
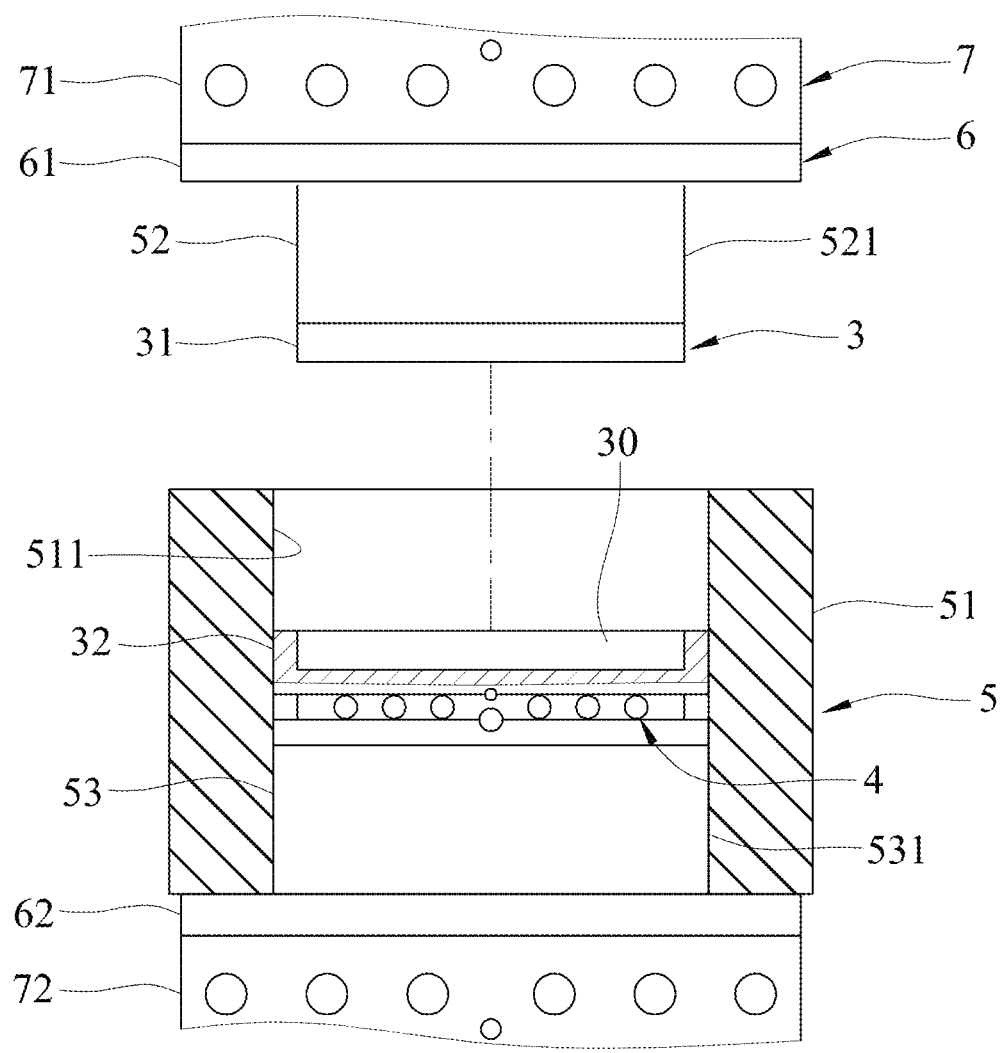
FIG. 4 is a fragmentary, partly-sectioned view illustrating a state that a mold unit of the embodiment is opened.
Figure 5:
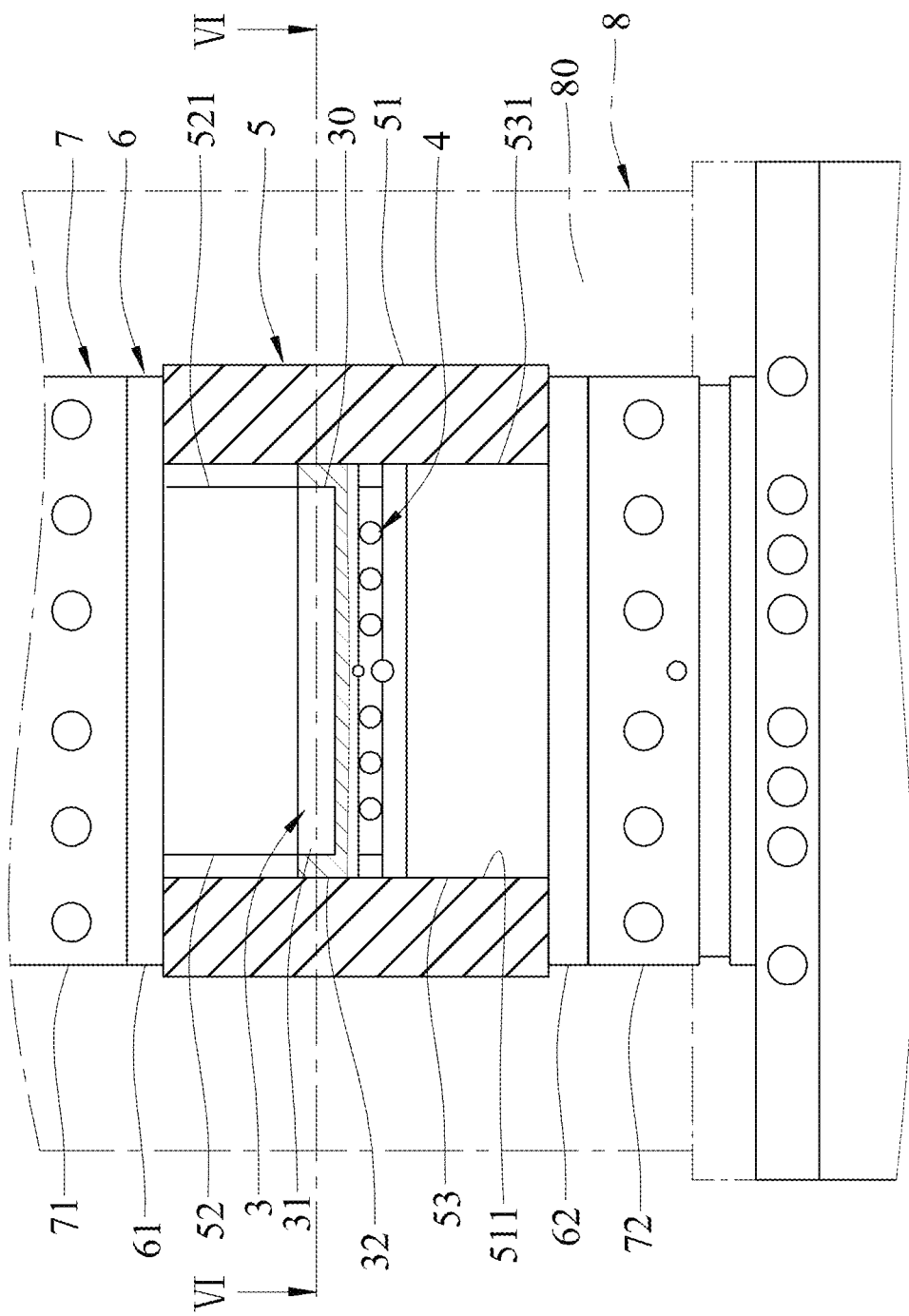
FIG. 5 is a fragmentary, partly-sectioned view illustrating a state that the mold unit is closed.
Figure 6:
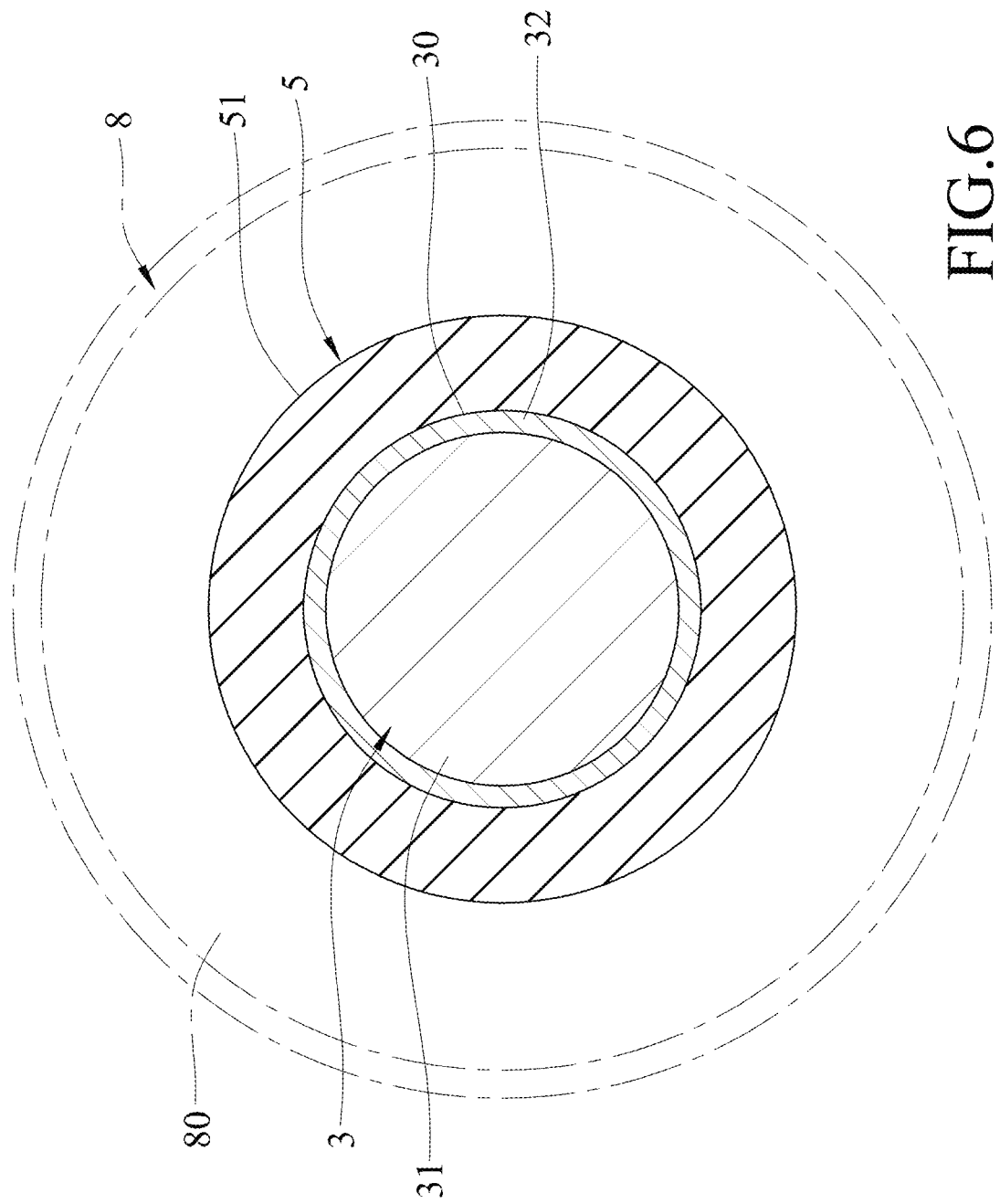
FIG. 6 is a sectional view taken along line VI-VI of FIG. 5.

Referring to FIGS. 4 to 6, when the first and second dies 31, 32 are in the molded and closed position, and when the vacuum unit 8 is in the vacuum position to form the vacuum space 80 for providing a vacuum environment, the heating unit 4 and the mold driving device 91 are actuated to perform a heating and pressing operation on an object or a material in the mold cavity 30. At this stage, the surrounding insulating member 51 can obstruct radiation of heat generated from the mold unit 3 along the periphery of the first and second dies 31, 32 outwardly of the vacuum space 80, and the first and second insulating layers 52, 53 can obstruct conduction of the heat along the direction of the axis (X) to the first and second heat dissipating layers 61, 62. Thus, the first and second insulating layers 52, 53 are configured to cooperatively define with the surrounding insulating member 51 a heat zone that contains the mold cavity 30, as indicated by the red regions in FIGS. 7 and 8.

A temperature of the heat zone ranges from 200° C. to 1700° C. The heat zone and the mold cavity 30 respectively have first and second longitudinal cross-sections which are parallel to the axis (X), and which have an area ratio that is less than 200%. The heat zone and the mold cavity 30 respectively have first and second transverse cross-sections which are normal to the axis (X), and which have an area ratio that is less than 100%.

Figure 7:
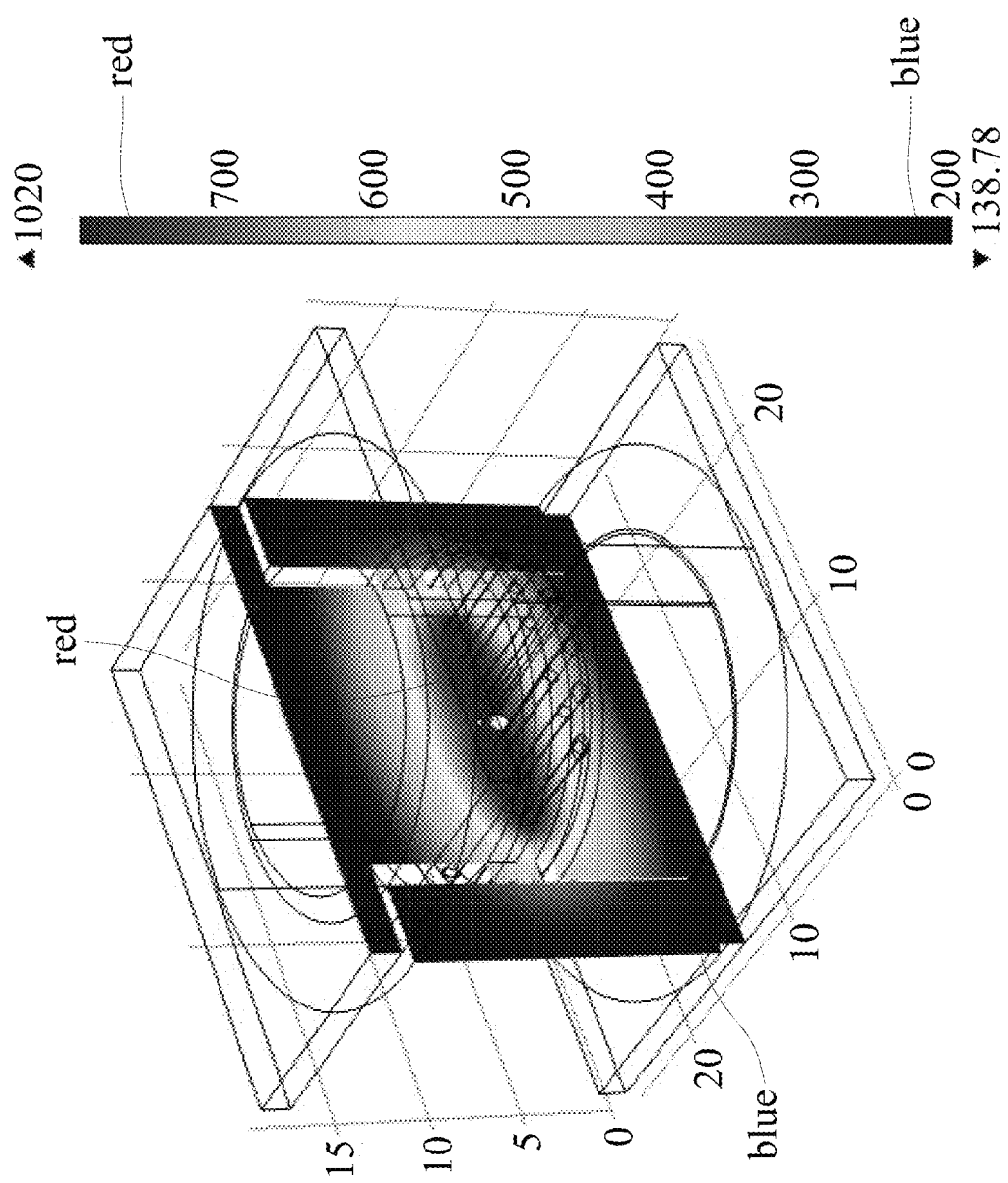
FIG. 7 is a view illustrating a vertical temperature distribution of a heat zone in the embodiment.
Figure 8:
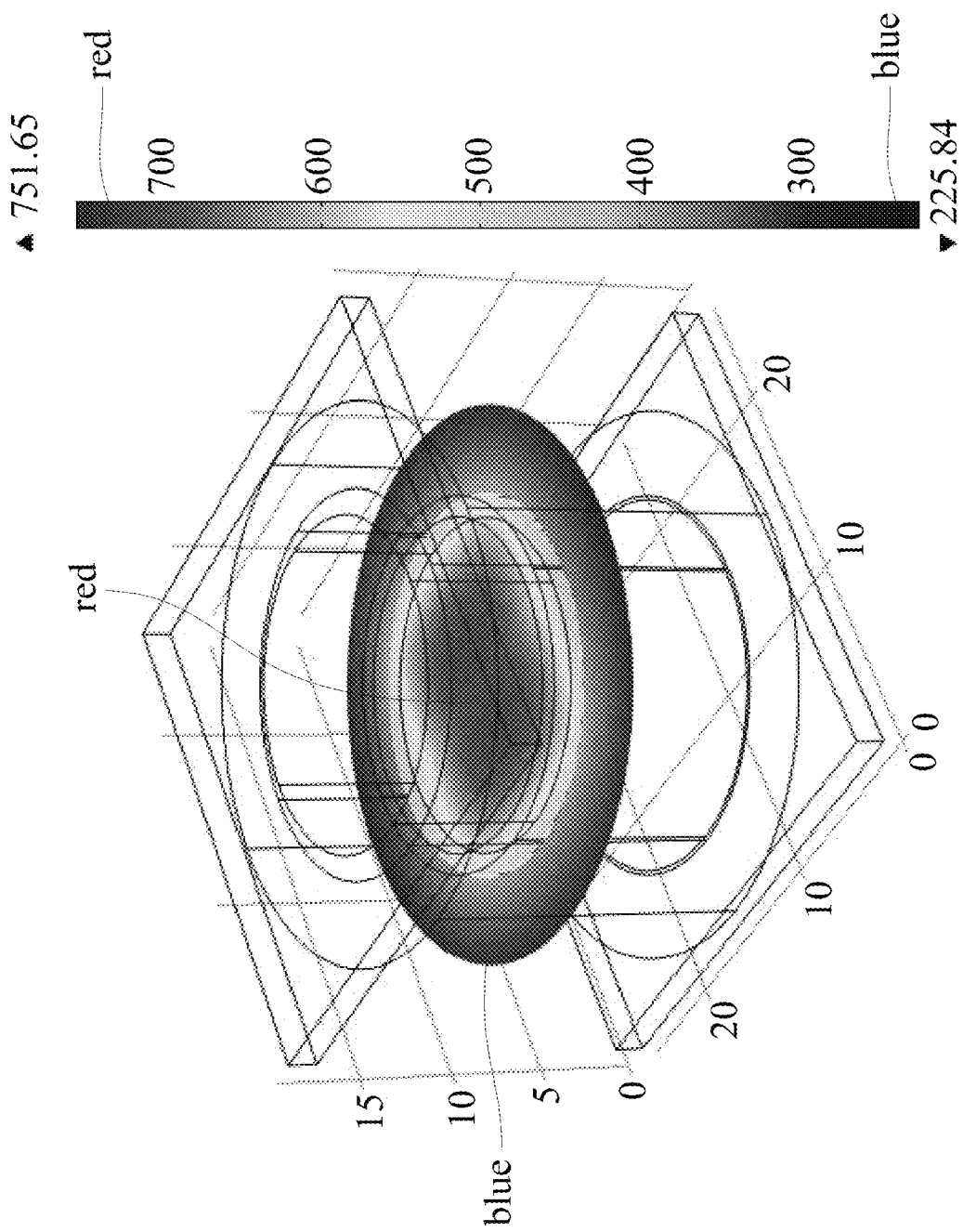
FIG. 8 is a view illustrating a horizontal temperature distribution of the heat zone.

With the heat insulating unit 5, a highest temperature in a zone between each of the first and second insulating layers 52, 53 and an adjacent one of the first and second heat dissipating layers 61, 62 is less than 400° C., and a highest temperature in a zone between each of the first and second heat dissipating layers 61, 62 and an adjacent one of the first and second cooling layers 71, 72 is less than 100° C., as indicated by the blue regions in FIGS. 7 and 8.

Referring to FIGS. 5 to 8, the first and second dies 31, 32 made from a zirconia material and heated to 900° C. are taken as an example. Note that, the red regions in FIGS. 7 and 8 represent the temperature of the heat zone which is about 730° C., and the blue regions in FIGS. 7 and 8 represent the temperature of about 160° C. (such temperature is much less than the maximum heat-resistance temperature of the hot-pressing molding machine, which is 400° C.)

As illustrated, under a vacuum environment, with the heat insulating unit 5 which defines therein a heat zone containing the mold cavity 30, other component parts adjacent to the heat zone, such as the first and second heat dissipating layers 61, 62, can be prevented from being damaged by high temperature so as to vest the hot-pressing molting machine with an applicability for a higher temperature process at a relatively long time.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A heated pressing molding machine comprising:
    a mold unit including first and second dies which are movable relative to each other along an axis and which respectively have first and second forming surfaces facing each other along the axis and defining a mold cavity therebetween when said first and second forming surfaces are moved closer to each other to place said mold unit in a closed position, and first and second distal die surfaces opposite to said first and second forming surfaces, respectively;

a heating unit disposed within one of said first and second dies to heat said mold unit when said mold unit is in the closed position;

a heat insulating unit including a surrounding insulating member which surrounds about the axis to enclose said mold unit when said mold unit is in the closed position, and first and second insulating layers which are disposed normal to the axis to be respectively attached to said first and second distal die surfaces of said first and second dies so as to obstruct conduction of heat generated from said mold unit and which respectively have first and second distal insulating surfaces remote from said first and second dies, said first and second insulating layers being movably inserted into and disposed inwardly of said surrounding insulating member in a direction of the axis;

a heat dissipating unit including first and second heat dissipating layers which are disposed normal to the axis to be respectively attached to said first and second distal insulating surfaces of said first and second insulating layers and which respectively have first and second distal dissipating surfaces remote from said first and second insulating layers;

a cooling unit including first and second cooling layers which are disposed normal to the axis to be respectively attached to said first and second distal dissipating surfaces so as to remove heat therefrom along the direction of the axis; and a vacuum unit disposed to be moved so as to enclose said mold unit, said heating unit, said heat insulating unit and said heat dissipating unit, and forming therein a vacuum space, wherein said surrounding insulating member is made from a fire retardant padding material, said first and second insulating layers being made from a zirconia or mica material, and being configured to cooperatively define with said surrounding insulating member a heat zone that contains said mold cavity, a temperature of said heat zone ranging from 730° C. to 1700° C., an inner surrounding surface of said surrounding insulating member being spaced apart from an outer peripheral surface of each of said first and second insulating layers by a gap that is less than 1 cm.

2. The heated pressing molding machine as claimed in claim 1, wherein said first and second heat dissipating layers are configured to respectively carry said first and second dies and to permit each of said first and second insulating layers to be sandwiched between a respective one of said first and second heat dissipating layers and a respective one of said first and second dies.

3. The heated pressing molding machine as claimed in claim 2, further comprising a driving unit which includes a mold driving device that is disposed to actuate a relative movement of said first and second dies, and at least one vacuum driving device disposed to actuate movement of said vacuum unit.

4. The heated pressing molding machine as claimed in claim 1, wherein a highest temperature in a zone between each of said first and second insulating layers and an adjacent one of said first and second heat dissipating layers is less than 400° C., a highest temperature in a zone between each of said first and second heat dissipating layers and an adjacent one of said first and second cooling layers is less than 100° C.

* * * * *